(12) United States Patent
Kim et al.

(10) Patent No.: US 12,539,681 B2
(45) Date of Patent: Feb. 3, 2026

(54) APPARATUS FOR MANUFACTURING LIGHT CONTROL FILM AND LIGHT CONTROL FILM MANUFACTURED BY SAME

(71) Applicant: LG CHEM, LTD., Seoul (KR)

(72) Inventors: Kangyoon Kim, Seoul (KR); Byeongheui Han, Seoul (KR); Bongtaek Hong, Seoul (KR); Woohyuck Chang, Seoul (KR); Dohyung Kwon, Seoul (KR); Solmon Park, Seoul (KR); Hosik Ryu, Seoul (KR); Seungsoo Shin, Seoul (KR); Kyuseok Han, Seoul (KR)

(73) Assignee: LG CHEM, LTD., Seoul (KR)

( * ) Notice: Subject to any disclaimer, the term of this patent is extended or adjusted under 35 U.S.C. 154(b) by 773 days.

(21) Appl. No.: 17/792,681

(22) PCT Filed: Jan. 14, 2020

(86) PCT No.: PCT/KR2020/000641
§ 371 (c)(1),
(2) Date: Jul. 13, 2022

(87) PCT Pub. No.: WO2021/145469
PCT Pub. Date: Jul. 22, 2021

(65) Prior Publication Data
US 2023/0047995 A1 Feb. 16, 2023

(51) Int. Cl.
*B29D 11/00* (2006.01)
*G02B 5/22* (2006.01)

(52) U.S. Cl.
CPC .. *B29D 11/00788* (2013.01); *B29D 11/00865* (2013.01); *G02B 5/22* (2013.01)

(58) Field of Classification Search
CPC ........ B29D 11/00788; B29D 11/00865; B29D 11/0048; G02B 5/22; B29C 31/08; B29C 59/04
See application file for complete search history.

(56) References Cited

U.S. PATENT DOCUMENTS

| 2011/0043921 A1 | 2/2011 | Kashiwagi et al. |
| 2011/0299270 A1 | 12/2011 | Kojima et al. |

(Continued)

FOREIGN PATENT DOCUMENTS

| CN | 102334047 A | 1/2012 |
| JP | 2005150333 A | 6/2005 |

(Continued)

OTHER PUBLICATIONS

English Translation of KR 10-2014-0004505A (Year: 2014).*

*Primary Examiner* — Stewart A Fraser
(74) *Attorney, Agent, or Firm* — Bryan Cave Leighton Paisner LLP

(57) ABSTRACT

An apparatus for manufacturing a light control film and a light control film manufactured by the same are provided. The apparatus comprises a film supply device supplying a base film, and a pattern formation mold applying pressure onto one side of the base film to form a pattern thereon, wherein the pattern formation mold comprises a main body and a pattern formation structure protruding from an outer surface of the main body and extending in a first direction, wherein a cross-section perpendicular to the first direction of the pattern formation structure comprises a pair of first intersecting lines, one ends of which are connected to the main body, and having a first intersecting angle; and a pair of second intersecting lines extending from the other ends of the pair of first intersecting lines respectively, and having a second intersecting angle smaller than the first intersecting angle.

5 Claims, 3 Drawing Sheets

(56) References Cited

U.S. PATENT DOCUMENTS

2013/0201573 A1\*  8/2013  Shiota .................... G02B 5/22
                                                       359/885
2019/0393348 A1   12/2019  Choi

FOREIGN PATENT DOCUMENTS

| | | |
|---|---|---|
| JP | 2008-242232 A | 10/2008 |
| JP | 2011034060 A | 2/2011 |
| JP | 2013086421 A | 5/2013 |
| JP | 2013205509 A | 10/2013 |
| JP | 5434245 B2 | 3/2014 |
| JP | 2007148185 A | 6/2017 |
| KR | 10-2013-0121286 A | 11/2013 |
| KR | 10-2014-0004505 A | 1/2014 |
| KR | 10-2015-0131676 A | 11/2015 |
| KR | 10-2017-0094697 A | 8/2017 |
| TW | 201304936 A1 | 2/2013 |

\* cited by examiner

APPARATUS FOR MANUFACTURING LIGHT CONTROL FILM AND LIGHT CONTROL FILM MANUFACTURED BY SAME

CROSS-REFERENCE TO RELATED APPLICATION(S)

This application is the U.S. national stage of International Application No. PCT/KR2020/000641 filed on Jan. 14, 2020.

FIELD OF DISCLOSURE

The present disclosure is related to an apparatus for manufacturing a light control film and a light control film manufactured by the same.

More particularly, the present disclosure is related to a light control film, in which a bent portion is formed in a groove portion, and an apparatus for manufacturing a light control film.

BACKGROUND

A light control film is an optical film configured to adjust light transmittance, which includes a light transmitting film having a plurality of parallel grooves, wherein a light absorbing material may be disposed in the grooves.

The light control film is usually disposed on an image display device and adjusts the degree of light absorption according to a viewing angle, thereby being capable of providing a function of passing light only within a specific angle range.

However, in the conventional light control film, the groove portion had a thin and slim shape according to the need for high aspect and aperture ratios of the groove portion.

Therefore, the surface scratch of the mold for forming the grooves was easy to occur, and there could be a problem of bending the shape of the grooves during the formation process of the grooves using the mold.

Furthermore, there was a problem that the white line phenomenon, in which the light absorbing material is not partially filled by the narrow entrance of the groove portion, is likely to occur.

SUMMARY

The technical problem to be solved by the present disclosure will be described as follows.

First, the present disclosure is intended to provide an apparatus for manufacturing a light control film comprising a pattern formation mold capable of forming a bent portion in a groove portion.

Second, the present disclosure is intended to provide a light control film in which a bent portion is formed in a groove portion.

Otherwise, the present disclosure is intended to solve all problems that can be generated or predicted from the prior arts in addition to the above-described technical problems.

An apparatus for manufacturing a light control film according to the present disclosure comprises a pattern formation structure capable of forming a bent portion in a groove portion.

Specifically, the apparatus for manufacturing a light control film comprises a pattern formation mold for forming a pattern by applying pressure on one side of the supplied base film.

The pattern formation mold comprises a main body and a pattern formation structure protruding from an outer surface of the main body and extending in a first direction.

In the pattern formation structure, a cross-section perpendicular to the first direction comprises a pair of first intersecting lines, one ends of which are connected to the main body, having a first intersecting angle.

In addition, it comprises a pair of second intersecting lines extending from the other ends of the pair of first intersecting lines, respectively and having a second intersecting angle smaller than the first intersecting angle.

The main body may have a cylindrical shape or a plate shape.

The first intersecting lines and the second intersecting lines may extend in a direction away from the main body.

The pattern formation structure is composed of a plurality of structures, which may be spaced apart from each other.

One end of the second intersecting line may be connected by an intersecting point or a connecting line.

The first intersecting line may have a length of 1 μm to 5 μm.

The first intersecting angle may be 80° to 100°.

The spaced-apart distance may be 20 μm to 70 μm.

It further comprises a coating device for coating a curable resin layer on at least one side of the supplied base film, wherein the coating device may be disposed between the film supply device and the pattern formation mold.

The pattern formation structure may form a pattern on the resin layer by applying pressure to the resin layer.

Meanwhile, the light control film according to an example of the present disclosure comprises a base film, a pattern forming layer disposed on the base film and comprising a groove portion formed on one surface opposite to a surface adjacent to the base film and extending in the first direction, and a light absorbing material disposed in the groove portion.

In the groove portion, a cross-section perpendicular to the first direction comprises a pair of first intersecting lines, one ends of which are connected to the one surface of the pattern forming layer, having a first intersecting angle, and a pair of second intersecting lines extending from the other ends of the pair of first intersecting lines, respectively and having a second intersecting angle smaller than the first intersecting angle, wherein the first intersecting angle is 80° to 100°.

The first intersecting line may have a length of 1 μm to 5 μm.

The groove portion is composed of a plurality of grooves, which may be spaced apart from each other.

The spaced-apart distance may be 20 μm to 70 μm.

The light absorbing material may be filled to said the other end of the first intersecting line in the groove portion.

Advantageous Effects

The effect provided by the apparatus for manufacturing a light control film thus configured according to the present disclosure and the light control film manufactured by the same will be described as follows.

In the apparatus for manufacturing a light control film of the present disclosure, the pattern formation structure of the pattern formation mold forms a bent portion, thereby being capable of reducing the bending of the groove portion in the light control film upon manufacturing the light control film.

Furthermore, it is possible to reduce the occurrence of surface scratches on the pattern formation structure by the bent portion of the pattern formation structure.

The light control film of the present disclosure can reduce the occurrence of the white line phenomenon, as the groove portion comprises the bent portion to improve the filling property of the light absorbing material.

DETAILED DESCRIPTION

Figure 1:
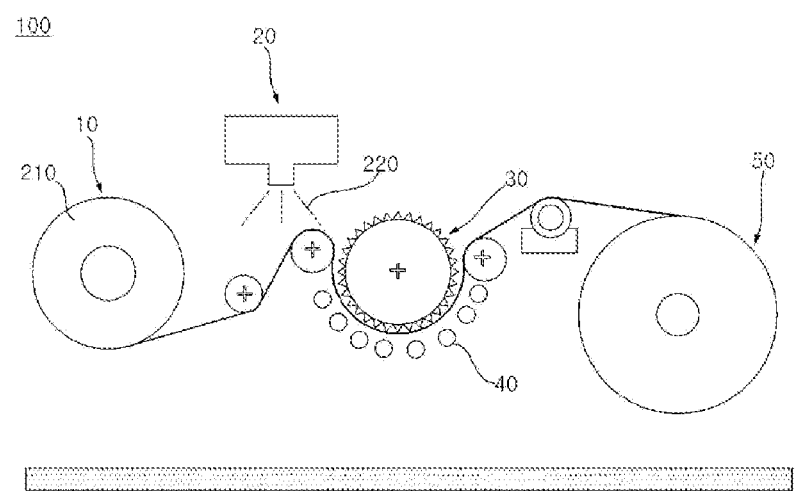
FIG. 1 is a cross-sectional diagram showing an apparatus for manufacturing a light control film according to an embodiment of the present disclosure.

Advantages and features of the present disclosure and methods for achieving them will become apparent with reference to examples to be described below.

The present disclosure is defined by the scope of the claims, and if there are separate descriptions for the meanings of terms in the specification, the term meanings will be defined by the above-described contents. Throughout the specification, the same reference numeral refers to the same component.

The apparatus (100) for manufacturing a light control film of the present disclosure comprises a pattern formation mold (30), wherein a pattern formation structure (32) of the pattern formation mold (30) comprises a bent portion (32c), thereby being capable of reducing appearance defects of the light control film (200).

In this regard, the apparatus (100) for manufacturing a light control film according to an embodiment of the present disclosure are described with reference to FIG. 1.

First, a film supply device (10) will be described.

The apparatus (100) for manufacturing a light control film according to an example of the present disclosure may comprise a film supply device (10) for providing a base film (210).

The base film (210) functions as a base support layer of the light control film (200) to be described below, where details will be described below.

The film supply device (10) winds the base film (210) in the form of a roll as one example, and the film supply device (10) rotates to release the base film (210) in the process progress direction, thereby being capable of supplying the base film (210).

However, the shape and operation contents of the film supply device (10) are not limited to the contents posted in the above description and drawings, which will include contents that can be easily designed and changed by those skilled in the art.

Subsequently, the apparatus (100) for manufacturing a light control film is positioned between the film supply device (10) and the pattern formation mold (30) to be described below, which may further comprise a coating device (20) for coating a resin layer (220') on at least one side of the supplied base film (210).

For example, the resin layer (220') may be coated on the front surface of the base film (210) to a predetermined thickness, and the resin layer (220') may be cured by subsequent heat or light curing treatment.

In addition, the resin layer (220') may also be coated on both sides of the base film (210), and the material of the resin layer (220') will include a range that can be easily selected by those skilled in the art.

However, the coating device (20) is not essential, and when the resin layer is already coated on the base film (210) supplied from the film supply device (10), the coating device (20) may also be omitted.

The apparatus (100) for manufacturing a light control film according to an example of the present disclosure may comprise a pattern formation mold (30) for applying pressure on one side of the base film (210) to form a pattern.

Specifically, the pattern formation mold (30) may partially apply pressure to the resin layer (220') coated on the base film (210) to form a pattern.

The pressure partially applied to the resin layer (220') may be made by the shape of the pattern formation mold (30), and the detailed structure of the pattern formation mold (30) will be described below.

In the resin layer (220') on which the pattern is formed by the pattern formation mold (30), the patterned resin layer (220') may be cured by the curing device (40).

The curing device (40) may use photocuring, for example, UV curing, according to curing characteristics of the resin layer (220'), or it may be thermally cured using a heat source.

The resin layer (220') cured by the curing device (40) may become a pattern forming layer (220) in which a pattern is maintained.

The pattern forming layer (220) formed by the curing device (40) may be separated from the pattern formation mold (30), and the pattern forming layer (220) and the base film (210) separated from the pattern formation mold (30) may be wound and stored by the collecting device (50).

Subsequently, the structure of the pattern formation mold (30) for forming a pattern on the resin layer (220') and/or the pattern forming layer (220) will be described in detail.

Figure 2:
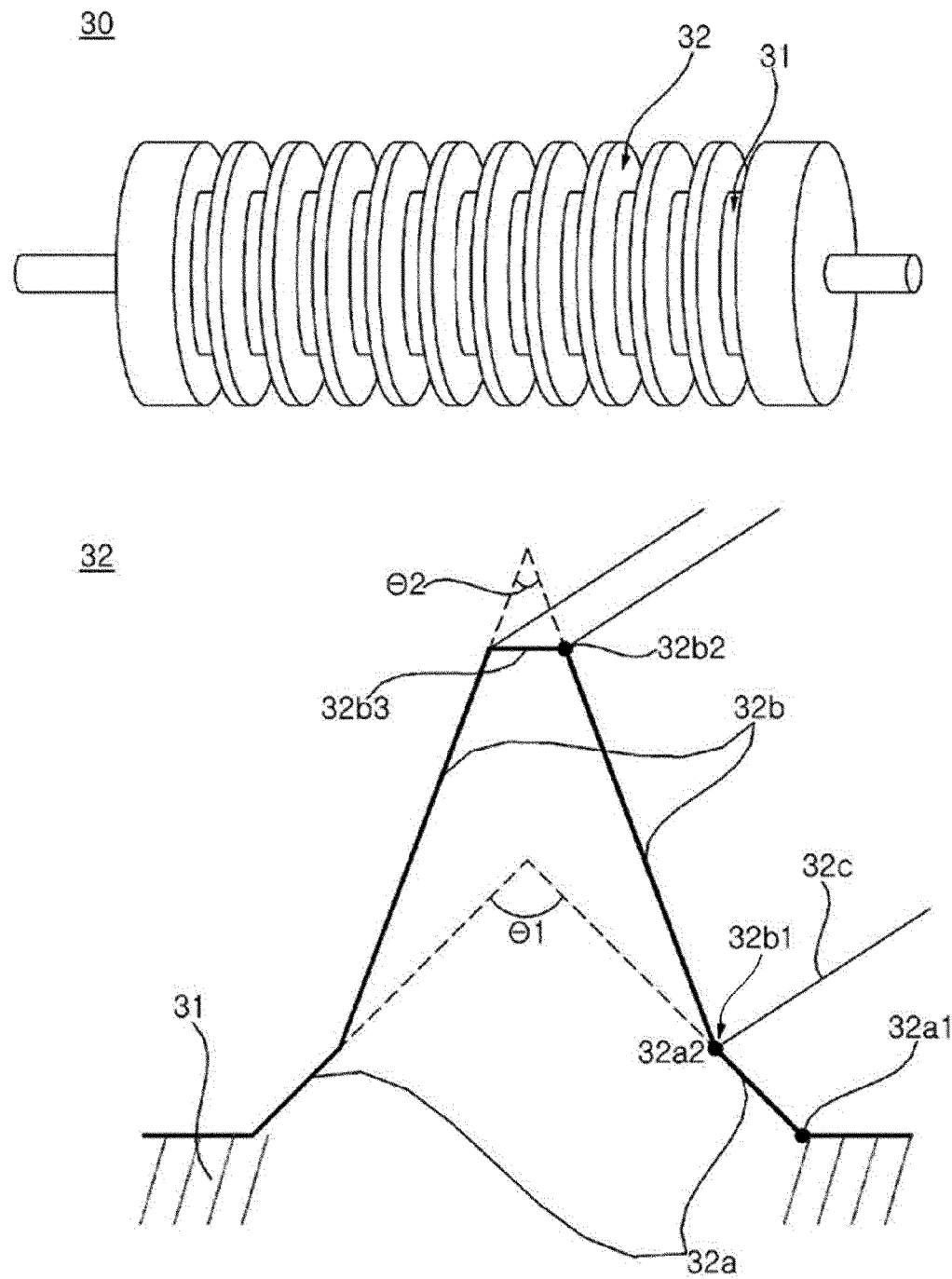
FIG. 2 is a perspective diagram and a partially enlarged cross-sectional diagram of a pattern formation mold of an apparatus for manufacturing a light control film according to an embodiment of the present disclosure.

Referring back to FIGS. 1 and 2, the pattern formation mold (30) may comprise a main body (31) and a pattern formation structure (32) protruding from an outer surface of the main body (31) and extending in the first direction.

The pattern formation structure (32) is composed of a plurality of structures, which may be spaced apart from each other.

For example, the pattern formation structure (32) may be spaced apart from each other with a spaced-apart distance of about 20 μm to about 70 μm.

The main body (31) may provide a basic shape of the pattern formation mold (30) and may function to be connected to the pattern formation structure (32), thereby supporting it.

The main body (31) may have a cylindrical shape, but the shape of the main body (31) is not limited thereto, and it will include a shape that can be easily designed and changed by those skilled in the art.

For example, the main body (31) may also have a polygonal column shape or a plate shape.

The pattern formation structure (32) protrudes from the main body (31) to the outside and substantially functions to partially apply pressure to the resin layer (220').

Specifically, as described above, the pattern formation structure (32) may have a structure that protrudes from an outer surface of the main body (31) and extends in the first direction.

For example, when the main body (31) has a cylindrical shape, the pattern formation structure (32) may be formed in a circumferential direction, and when the main body (31) has a plate shape, the pattern formation structure (32) may be formed in a straight direction.

Meanwhile, the pattern formation structure (32) comprises a bent portion (32c) formed on the outer surface, so that upon manufacturing the light control film (200), the bending of the groove portion (221) in the light control film (200) or the scratch occurrence of the groove portion (221) inner surface is reduced, whereby it is possible to reduce the appearance defects of the light control film (200).

The bent portion (32c) of the pattern formation structure (32) may be formed on a side surface of the pattern formation structure (32). Accordingly, the side surface of the pattern formation structure (32) may form a structure that the surfaces having different inclinations meet to be bent at a predetermined angle.

Specifically, when the pattern formation structure (32) is viewed from a cross-section perpendicular to the first direction, the cross-section of the pattern formation structure (32) may comprise a pair of first intersecting lines (32a), one ends of which are connected to the main body (31), having a first intersecting angle (θ1).

The pair of first intersecting lines (32a) are of two-line segments, wherein the respective line segments have one ends (32a1) connected to the main body (31), which may extend to the outside of the main body (32) so that they may form a first intersecting angle (θ1) between each other.

Each first intersecting line (32a) may have a length of about 1 μm to about 5 μm.

The other ends (32a2) of the pair of first intersecting lines (32a) are not in contact with each other and are spaced apart from each other, and merely, the first intersecting angle (θ1) formed by intersecting virtual lines extending from said the other ends (32a2) of the first intersecting lines (32a), respectively, may be less than about 180 degrees, and may be about 80 degrees to about 100 degrees.

In addition, the cross-section of the pattern formation structure (32) may comprise a pair of second intersecting lines (32b) connected to the pair of first intersecting lines (32a), respectively.

The pair of second intersecting lines (32b) extend from said the other ends (32a2) of the first intersecting lines (32a), respectively, which may have a second intersecting angle (θ2) smaller than the first intersecting angle (θ1).

Specifically, the second intersecting lines (32b) are of two-line segments, wherein the respective one ends (32b1) of the second intersecting lines (32b) are connected to said the other ends (32a2) of the first intersecting lines (32a), which may extend in the outside direction of the main body (31) so that they may have a second intersecting angle (θ2) from each other.

Said the other ends (32b2) of the pair of second intersecting lines (32b) may be spaced apart from each other without being in contact with each other or may be directly connected by an intersecting point.

When said the other ends (32b2) of the second intersecting lines (32b) are spaced apart from each other without contacting each other, said the other ends (32b2) may be connected by a connecting line (32b3).

The second intersecting angle (θ2) is formed by intersecting real or virtual lines extending from said the other ends (32b2) of the second intersection lines (32b), similar to the first intersecting angle (θ1), which may be smaller than the first intersecting angle (θ1).

Accordingly, a bent portion (32c), in which the side surface of the pattern formation structure (32) is bent, is formed at a portion where the first intersecting line (32a) and the second intersecting line (32b) meet.

Furthermore, since the second intersecting angle (θ2) is greater than the first intersecting angle (θ1), the pattern formation structure (32) may protrude more sharply as it moves away from the main body (31) based on the bent portion (32c).

As described above, the pattern formation structure (32) comprises a bent portion (32c), so that upon manufacturing the light control film (200), the bending of the groove portion (221) in the light control film (200) or the scratch occurrence of the groove portion (221) inner surface is reduced, whereby it is possible to reduce the appearance defects of the light control film (200).

Specifically, the pattern formation structure (32) may be formed by partially cutting the surface of the pattern formation mold (30).

Accordingly, a significant amount of impact or force may be continuously applied to the pattern formation structure (32) during the process of forming the plurality of pattern formation structures (32) through surface cutting. As a result, the pattern formation structure protruding in a narrow area is bent to one side or the pattern formation structure is formed in an area larger than the design area, so that there may be a problem that the viewing angle of the light control film is asymmetrical compared to the design or the transmittance is lowered.

However, in the pattern formation structure (32) according to an example of the present disclosure, a portion adjacent to the main body (31) based on the bent portion (32c) is connected to the main body (31) with a relatively large area, so that effectively, the structure of the bent portion (32c) upper end portion in the pattern formation structure (32) may be stably maintained.

Accordingly, even if significant impact or force is applied to the protruding pointed-shaped pattern formation structure (32) in the process of forming the pattern formation structure (32), the deformation of the pattern formation structure (32) may be reduced and the shape defects of the groove portion (221) formed in the light control film (200) may also be reduced.

Furthermore, the pattern formation structure (32) according to an example of the present disclosure comprises the bent portion (32c), whereby it is possible to reduce the occurrence of scratches on the inner surface of the pattern formation structure (32) or the groove portion (221).

Specifically, as described above, in the process of forming the pattern formation structure (32), a large amount of chips may be generated when the surface of the pattern formation mold (30) is cut.

These chips may break in the middle depending on the cutting shape, and may form scratches on the cutting surface by the broken chip portion.

Accordingly, the pattern formation structure (32) according to an example of the present disclosure comprises the bent portion (32c) and thus the area of the portion adjacent to the main body (31) is formed to be relatively large, so that chips generated from the side or bottom surface to be cut are not easily broken, and as a result, it is possible to reduce the occurrence of scratches by chips on the cutting surface.

Additionally, the first intersecting angle (θ1) may be about 80 degrees to about 100 degrees, and the pattern formation structure (32) according to an example of the present disclosure controls the first intersecting angle (θ1) as above, whereby chip discharge may be performed stably, and it is possible to minimize surface scratches or warpage of the pattern formation structure (32).

Moreover, the pattern formation structure (32) according to an example of the present disclosure may also reduce shape defects of the groove portion (221) that may occur in the process of separating the cured pattern forming layer (220) or the resin layer (220') to be cured from the pattern formation mold (30).

Specifically, the pattern formation structure (32) and the pattern (groove portion (221)) of the cured pattern forming layer (220) or the resin layer (220') to be cured matching the same are separated.

In this process, the portion of the pattern formation structure (32) adjacent to the main body (31) based on the bent portion (32c) has a relatively large area, so that the upper side opening portion of the groove portion (221) separated from the pattern formation structure (32) is formed in an expanded shape, and as a result, the easiness of separation between the pattern forming layer (220) or the resin layer (220') and the pattern formation structure (32) is improved, whereby it is possible to reduce the shape deformation or the inner surface damage of the groove portion (221).

Subsequently, the light control film (200) according to an example of the present disclosure will be described.

The light control film (200) may be manufactured by the apparatus (100) for manufacturing a light control film.

Figure 3:
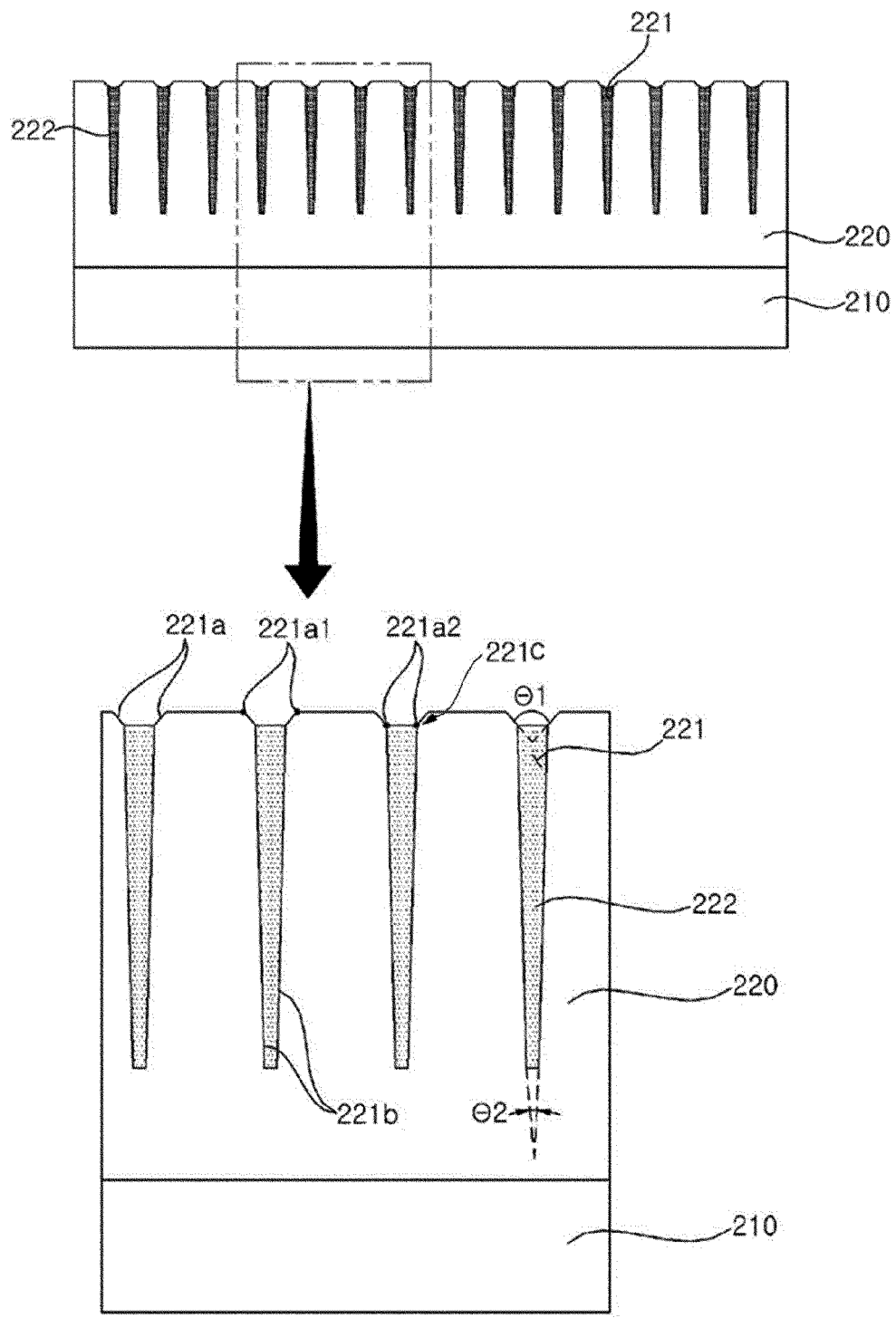
FIG. 3 is a cross-sectional diagram and a partially enlarged diagram of a light control film according to an embodiment of the present disclosure.

Referring to FIG. 3, the light control film (200) may comprise a base film (210).

As described above, the base film (210) may function as a base support layer of the light control film (200).

The base film (210) may comprise PET, PC, TAC, and the like, but the constituent material of the base film (210) is not limited to the above description, which will include a range that can be easily selected by those skilled in the art.

A pattern forming layer (220) may be disposed on one side of the base film (210), and an adhesive primer layer may be optionally added between the base film (210) and the pattern forming layer (220) for stability of attachment of the pattern forming layer (220).

Furthermore, a coating layer such as an antireflection layer may also be added on the other side of the base film (210) opposite to the pattern forming layer (220).

The pattern forming layer (220) is a portion through which light passes, which may comprise a groove portion (221) formed on one surface opposite to a surface adjacent to the base film (210) and extending in the first direction.

The pattern forming layer (220) may comprise a cured product of a curable resin, and for example, it may comprise a cured product of a UV-curable resin.

The groove portion (221) may have a structure corresponding to the shape of the pattern formation structure (32) of the above-described pattern formation mold (30) as a shape concave into the pattern forming layer (220).

Accordingly, the descriptions of the first intersecting lines (32a) and the second intersecting lines (32b) of the pattern formation structure (32) can be applied to the first intersecting lines (221a) and the second intersecting lines (221b) of the groove portion (221) as such.

In addition, the groove portion (221) is formed of a plurality of grooves, which may be spaced apart from each other.

The cross-section of the groove portion (221) perpendicular to the first direction may comprise a pair of first intersecting lines (221a), one ends (221a1) of which are connected to the one surface of the pattern forming layer (220), having a first intersecting angle (θ1).

Unlike the pattern formation structure (32), an opening portion is formed between one ends (221a1) of the first intersecting lines (221a), which may have a shape that the area of the opening portion is narrowed toward the inside of the pattern forming layer (220).

In addition, the cross-section of the groove portion (221) may comprise a pair of second intersecting lines (221b) extending from the other ends (221a2) of the first intersecting lines (221a), respectively and having a second intersecting angle (θ2) smaller than the first intersecting angle (θ1).

Accordingly, the bent portion (221c) may also be formed on the inner surface of the groove portion (221).

A light absorbing material (222) may be disposed inside the groove portion (221). Specifically, the light absorbing material (222) may be disposed in such a way that the light absorbing material (222) is filled into the formed groove portion (221).

The light absorbing material (222) may be a material capable of absorbing or blocking light in at least a portion of the visible spectrum.

For example, the light absorbing material (222) may include a black colorant such as carbon black or black beads, and the composition and concentration of the light absorbing material (222) may be adjusted in consideration of light absorption and blocking performance.

The light absorbing material (222) may be filled up to the other ends (221a2) of the first intersection lines (221a) of the groove portion (221).

As described above, in the light control film (200) according to an example of the present disclosure, the portion of the groove portion (221) close to the front surface based on the bent portion (221c) is formed in an expanded shape, and the light absorbing material (222) is filled up to the other ends (221a2) of the first intersecting lines (221a) in the groove portion (221), whereby it is possible to effectively reduce the white line phenomenon that occurs as the light absorbing material (222) is not sufficiently filled due to the foreign material being caught in the narrow opening.

Furthermore, the light absorbing material (222) is filled up to the other ends (221a2) of the first intersection lines (221a) of the groove portion (221), whereby it is possible to prevent the aperture ratio from being excessively decreased.

Specifically, when the light absorbing material (222) is filled up to the one ends (221a1) of the first intersecting lines (221a), the aperture ratio may excessively decrease because the light incidence area is reduced by the light absorbing material (222) on one side. Accordingly, in an example of the present disclosure, the filling position of the light absorbing material (222) may be controlled by the other ends (221a2) of the first intersecting lines (221a).

Subsequently, referring to Tables 1 and 2, characteristic changes according to the length of the first intersecting line (221a) and the first intersecting angle in the light control film (200) according to an example of the present disclosure will be described.

TABLE 1

| Fist intersecting angle (°) | Scratch and warpage occurrence |
| --- | --- |
| 20° | Occurrence |
| 40° | Occurrence |
| 60° | Occurrence |
| 80° | No occurrence |
| 100° | No occurrence |
| 120° | Occurrence |
| 140° | Occurrence |
| 160° | Occurrence |

In Table 1 above, the occurrence of scratches and warpage according to the change of the first intersecting angle in the pattern formation mold (30) and the groove portion (221) is visually observed and recorded.

Referring to Table 1 above, the light control film (200) of the present disclosure maintains the first intersecting angle between 80° and 100°, whereby it is possible to effectively prevent the occurrence of scratches and warpage.

TABLE 2

| Length of first intersecting line (221a) [μm] | White line occurrence | Whether or not the light absorbing material remains in the portion of the first intersecting line |
|---|---|---|
| 1 | Occurrence | No occurrence |
| 2 | No occurrence | No occurrence |
| 3 | No occurrence | No occurrence |
| 4 | No occurrence | No occurrence |
| 5 | No occurrence | No occurrence |
| 6 | No occurrence | Occurrence |
| 7 | No occurrence | Occurrence |
| 8 | No occurrence | Occurrence |

In Table 2 above, the occurrence of white lines according to the length change of the first intersecting line (221a) in the groove portion (221) and the remains of the light absorbing material in the first intersecting line portion are visually observed and recorded.

Referring to Table 2 above, when the light control film (200) of the present disclosure controls the length of the first intersecting line (221a) to be 2 μm to 5 μm, the white line phenomenon is prevented and simultaneously it is prevented that the light absorbing material (222) remains in the first intersecting line portion, whereby it is possible to prevent the aperture ratio from decreasing.

In this specification, the first intersecting line portion means a space between the other end (221a2) of the first intersecting line and one end (221a1) of the first intersecting line.

Although the examples of the present disclosure have been illustrated and described as above, the present disclosure is not limited to the above-described specific examples, and without departing from the gist of the present invention as claimed in the claims, various modifications may be performed by those having ordinary knowledge in the technical field to which the relevant disclosure pertains, and these modifications should not be individually understood from the technical spirit or perspective of the present disclosure.

The invention claimed is:

1. A light control film comprising:
a base film;
a pattern forming layer disposed on the base film and comprising a groove portion formed on one surface opposite to a surface adjacent to the base film and extending in the first direction; and
a light absorbing material disposed in the groove portion,
wherein a cross-section perpendicular to the first direction of the groove portion comprises:
a pair of first intersecting lines, one ends of which are connected to the one surface of the pattern forming layer, and having a first intersecting angle; and
a pair of second intersecting lines extending from the other ends of the pair of first intersecting lines respectively and having a second intersecting angle smaller than the first intersecting angle,
wherein an opening portion is formed between one ends of the first intersecting lines, which has a shape that an area of the opening portion is narrowed toward an inside of the pattern forming layer, and
wherein the first intersecting angle is 80 degrees to 100 degrees.

2. The light control film according to claim 1, wherein each of the pair of first intersecting line has a length of 1 μm to 5 μm.

3. The light control film according to claim 1, wherein the pattern forming layer comprises a plurality of the groove portions and the groove portions are spaced apart from each other.

4. The light control film according to claim 3, wherein a distance between the groove portions spaced apart from each other is from 20 μm to 70 μm.

5. The light control film according to claim 1, wherein the light absorbing material is filled to said the other ends of the first intersecting lines in the groove portion.

* * * * *